US005599893A

United States Patent [19]

Asai et al.

[11] Patent Number: 5,599,893

[45] Date of Patent: Feb. 4, 1997

[54] WATER REPELLENT COMPOSITION

[75] Inventors: Mitsuo Asai; Hitoshi Uehara; Ichiro Ono, all of Usui-gun; Hiroaki Kobayashi, Osaka; Jun Kawaguchi, Osaka; Satoshi Shiiki, Osaka; Kazuishi Mitani, Osaka, all of Japan

[73] Assignee: Shin-Etsu Co., Ltd., Japan

[21] Appl. No.: 514,516

[22] Filed: Aug. 11, 1995

[30] Foreign Application Priority Data

Aug. 12, 1994 [JP] Japan .................................... 6-212121

[51] Int. Cl.$^{6}$ ..................................................... C08G 77/08

[52] U.S. Cl. .............................. 528/12; 525/477; 528/21; 528/23; 528/42

[58] Field of Search .................................. 528/12, 21, 23, 528/42; 525/477

[56] References Cited

U.S. PATENT DOCUMENTS

| | | | |
|---|---|---|---|
| 5,300,239 | 4/1994 | Ozaki et al. | 528/42 |
| 5,371,155 | 12/1994 | Kobayashi | 528/42 |

OTHER PUBLICATIONS

Abstract, JP–A–5059285, Database PAJ/JPO, Sep. 3, 1993.
Abstract, JP–A–4 144 940, Database WPI, Derwent Publications Ltd., London, GB, May 19, 1992.
Abstract of JP 04–144940 May 1992.
Abstract of JP 04–096935 Mar. 1992.
Abstract of JP 03–290437 Dec. 1991.
Abstract of JP 02–233535 Sep. 1990.
Abstract of JP 02–049082 Feb. 1990.
Abstract of JP 60–221470 Nov. 1985.
Abstract of JP 58–147484 Sep. 1983.

*Primary Examiner*—Melvyn I. Marquis
*Attorney, Agent, or Firm*—Millen, White, Zelano & Branigan, P.C.

[57] ABSTRACT

A hydrolyzate resulting from co-hydrolysis of a perfluoroalkyl group-containing organic silicon compound and a hydrolyzable group-containing methylpolysiloxane compound in a hydrophilic solvent is blended with an organopolysiloxane and a strong acid to constitute a water repellent composition which is effective for imparting water repellency and facilitating falling of water droplets and thus imparting excellent water repellency and stain-proofness to a surface of an article treated therewith.

4 Claims, No Drawings

WATER REPELLENT COMPOSITION

BACKGROUND OF THE INVENTION

1. Field of the Invention

This invention relates to a water repellent agent for use in treating inorganic materials such as glass, ceramics and metals for imparting long-lasting water repellency and stain-proofness to their surface.

2. Prior Art

Various research endeavors have been made for enhancing the performance and expanding the applicable range of inorganic materials such as glass, ceramics and metals by treating the inorganic materials at their surface with various surface treating agents for improving surface properties. One typical technique is to treat an inherently hydrophilic surface with a silicone composition for modifying the surface to be water repellent.

Japanese Patent Application Kokai (JP-A) Nos. 147484/1983, 221470/1985 and 96935/1992 disclose that polysiloxanes and polysilazanes having a perfluoroalkyl group excel in water repellency. These water repellent agents are excellent in water repellency, but less effective in allowing water droplets to fall down. When they are applied to glazing in houses and buildings as stain-proof treating agents, water droplets tend to stay on the glazing surface as dots instead of falling down. Then the glazing is undesirably stained because dust, debris and oil in the atmosphere can adhere to such water droplets.

Also fluorinated silazane compounds are disclosed in JP-A 290437/1991. Although these compounds eliminate the above-mentioned drawback, they are substantially insoluble in conventional organic solvents. They are soluble only in Freons currently under federal restriction such as 1,1,3-trichlorotrifluoroethane and expensive fluorinated hydrocarbons. This limits the application range.

Japanese Patent Publication (JP-B) No. 15473/1975 discloses a mixture of dimethylpolysiloxane and strong acid. This mixture is superior in water repellency and water droplet falling, but is less durable in a sense that its action does not last long.

JP-B 38950/1977 discloses a stain-proof processing composition comprising a perfluoroalkoxysilane, an alkoxysilane, and a diol. JP-A 233535/1990 discloses a glass surface treating composition comprising a silane having a perfluoroalkyl group, an organopolysiloxane, an acid, and a volatile organic solvent. JP-A 144940/1992 discloses a water- and oil-repellent composition comprising an organopolysiloxane, a silane or siloxane containing a perfluoroalkyl group, and an acid. These compositions have superior water repellency, but fail to maintain that repellency for a long term.

There is a need to develop an agent which is durably water repellent.

Therefore, an object of the present invention is to provide a water repellent agent which is effective for treating inorganic materials to render their surface water repellent, allow water droplets on their surface to fall down, and impart durable water repellency and stain-proofness to their surface and which is soluble in ordinary organic solvents.

SUMMARY OF THE INVENTION

According to the present invention, there is provided a water repellent composition comprising in admixture, (1) a hydrolyzate resulting from co-hydrolysis of a perfluoroalkyl group-containing organic silicon compound of the general formula (I) and a hydrolyzable group-containing methylpolysiloxane compound of the general formula (II) in a hydrophilic solvent, (2) an organopolysiloxane of the general formula (III), and (3) a strong acid.

Formula (I):

$$C_pF_{2p+1}QSi(R^1_a)R^2_{3-a} \quad (I)$$

$R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12.

Formula (II):

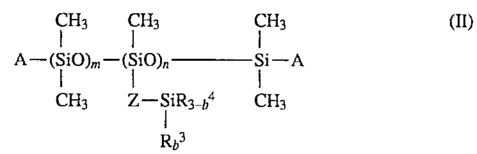

$R^3$ is a monovalent hydrocarbon group having 1 to 4 carbon atoms, $R^4$ is an alkoxy or acyloxy group having 1 to 4 carbon atoms, A is a methyl group or a group represented by $—Z—Si(R^3_b)R^4_{3-b}$, Z is an oxygen atom or a divalent organic group having 2 to 10 carbon atoms, letter b is equal to 0, 1 or 2, m is an integer of 3 to 100, n is an integer of 0 to 50, and $5 \leq m+n \leq 100$. Either one of the terminal A groups is a group represented by $—Z—Si(R^3_b)R^4_{3-b}$ when n=0, and where there is more than one $—Z—Si(R^3_b)R^4_{3-b}$, they may be identical or different.

Formula (III):

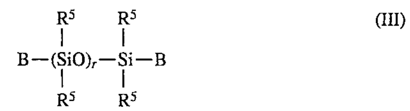

$R^5$, which may be identical or different, is a monovalent hydrocarbon group having 1 to 20 carbon atoms, B, which may be identical or different, is a hydroxyl group, monovalent hydrocarbon group having 1 to 4 carbon atoms, alkoxy group or acyloxy group, and letter r is an integer of 1 to 100.

More particularly, the perfluoroalkyl group-containing organic silicon compound of formula (I) is effective in imparting water repellency and the hydrolyzable group-containing methylpolysiloxane compound of formula (II) is effective for allowing water droplets to flow down. Since a hydrolyzate resulting from co-hydrolysis of these compounds has a silanol group fully reactive with an inorganic surface, it can impart water repellency and stain-proofness to an inorganic surface treated therewith. In addition, the organopolysiloxane of formula (III) is effective for further improving water droplet falling. The strong acid is effective for further improving the reactivity of the perfluoroalkyl group-containing organic silicon compound and the hydrolyzable group-containing methylpolysiloxane compound with an inorganic surface, which contributes to durability in that the performance of the composition lasts long. Since all these components are soluble in hydrophilic solvents, the composition is applicable to a wide variety of materials without the aid of special fluorinated solvents.

By blending components (1), (2) and (3), there is obtained a water repellent composition which has improved water repellency and water droplet falling, is effective for treating a material to impart such improved water repellency and stain-proofness to its surface, and is applicable to a wide range of articles without restriction.

DETAILED DESCRIPTION OF THE INVENTION

The water repellent composition of the present invention contains as a first component (1) a hydrolyzate resulting from co-hydrolysis of a perfluoroalkyl group-containing organic silicon compound of the general formula (I) and a hydrolyzable group-containing methylpolysiloxane compound of the general formula (II) in a hydrophilic solvent The perfluoroalkyl group-containing organic silicon compound is of the general formula (I).

$$C_pF_{2p+1}QSi(R^1_a)R^2_{3-a} \quad (I)$$

In formula (I), $R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12.

Typically, $R^1$ is selected from methyl, ethyl, n-propyl, isopropyl, n-butyl, isobutyl and s-butyl groups, for example. $R^2$ is selected from methoxy, ethoxy, n-propoxy, isopropoxy, isopropenoxy, n-butoxy, and acetoxy groups, for example. Q is a group of connecting a perfluoroalkyl group to the silicon atom, for example, divalent hydrocarbon groups (e.g., alkylene groups) and divalent hydrocarbon groups (e.g., alkylene groups) containing an oxygen, nitrogen or sulfur atom in the form of O, NH, CONH, OCONH, and $SO_2$ groups. Examples of the group represented by Q include $—CH_2CH_2—$, $—CH_2OCH_2CH_2CH_2—$, $—CONHCH_2CH_2CH_2—$, $—CONHCH_2CH_2NHCH_2CH_2CH_2—$, $—SO_2NHCH_2CH_2CH_2—$, and $—CH_2CH_2OCONHCH_2CH_2CH_2—$. Letter p represents the number of carbon atoms in the perfluoroalkyl group and ranges from 1 to 12. with p in excess of 12, corresponding hydrolyzates become less soluble in organic solvents.

Below shown are examples of the perfluoroalkyl group-containing organic silicon compound of formula (I). These compounds may be used alone or in admixture of two or more.

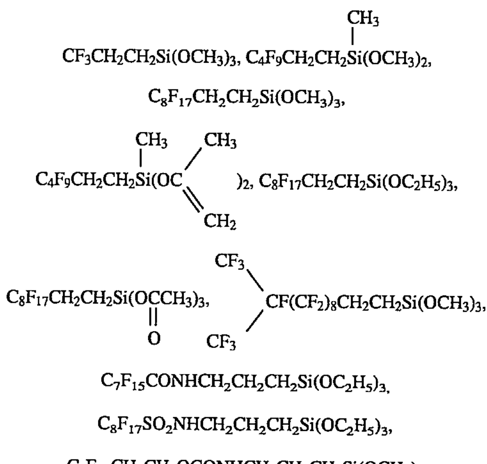

Preferred among these are $C_4F_9CH_2CH_2Si(CH_3)(OCH_3)_2$ and $C_8F_{17}CH_2CH_2Si(OCH_3)_3$.

The hydrolyzable group-containing methylpolysiloxane compound is of the general formula (II).

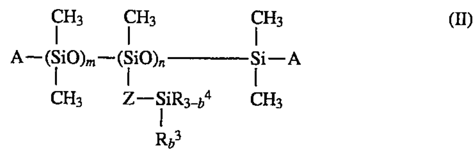

In formula (II), $R^3$ is a monovalent hydrocarbon group having 1 to 4 carbon atoms, $R^4$ is an alkoxy or acyloxy group having 1 to 4 carbon atoms, and A is a methyl group or a group represented by

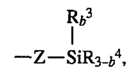

wherein Z is an oxygen atom or a divalent organic group having 2 to 10 carbon atoms as defined for Q, and b is equal to 0, 1 or 2. Letter m is an integer of 3 to 100, n is an integer of 0 to 50, and $5 \leqq m+n \leqq 100$. Either one of the terminal A groups is a group represented by $—Z—Si(R^3_b)R^4_{3-b}$ when n=0. Where there is more than one $—Z—Si(R^3_b)R^4_{3-b}$, they may be identical or different.

Exemplary groups of $R^3$ are the same as described for $R^1$. Exemplary groups of $R^4$ are the same as described for $R^2$. Z is preferably an oxygen atom or alkylene group, with examples of the alkyl group shown below.

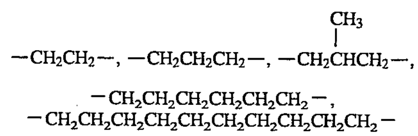

$$—CH_2CH_2CH_2CH_2CH_2CH_2—,$$
$$—CH_2CH_2CH_2CH_2CH_2CH_2CH_2CH_2CH_2CH_2—$$

Letter m is an integer of 3 to 100, n is an integer of 0 to 50, and $5 \leqq m+n \leqq 100$, preferably $10 \leqq m+n \leqq 50$. If the sum of m and n is less than 5, corresponding hydrolyzates less facilitate dropping of water droplets and are thus less stain-proof. If the sum of m and n exceeds 100, corresponding hydrolyzates become less stable.

Examples of the compound of formula (II) are shown below.

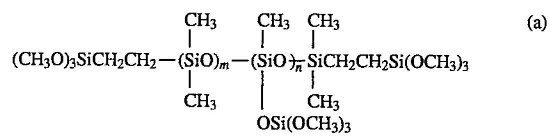

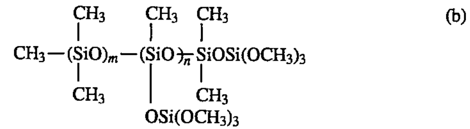

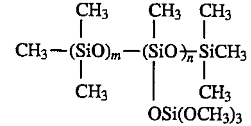

In the formulae, m and n are as defined above.

For the compounds of formula (II), it is preferred that their molecular chain is terminated with a $—Z—Si(R^3_b)R^4_{3-b}$ group and letter b is equal to 0 or 1, especially 0. In this respect, preferred compounds of formula (II) are the compounds of formulae (a) and (b) shown above.

Preferably the perfluoroalkyl group-containing organic silicon compound of formula (I) and the hydrolyzable group-containing methylpolysiloxane compound of formula (II) are blended such that the weight ratio of (I)/(II) may range from 10/90 to 90/10, especially from 20/80 to 80/20. Less than 10% by weight of the compound of formula (I) blended would sometimes fail to provide sufficient water repellency whereas more than 90% by weight of the compound of formula (I) blended would somewhat inhibit dropping of water droplets, resulting in less stain-proofness.

A hydrophilic solvent is used in co-hydrolysis of the two compounds mentioned above. It may be selected from conventional solvents in which the compounds of formulae (I) and (II) and water are soluble. Examples of the hydrophilic solvent include alcohols such as methanol, ethanol, isopropanol, n-propanol, n-butanol, i-butanol, s-butanol, and t-butanol; cellosolves such as methyl cellosolve, ethyl cellosolve, butyl cellosolve, and cellosolve acetate; ketones such as acetone and methyl ethyl ketone; and ethers such as dioxane and tetrahydrofuran. The hydrophilic solvent may be used in any desired amount, preferably in such amounts that the concentration of the compounds of formulae (I) and (II) combined may range from about 1 to 30% by weight, more preferably about 3 to 15% by weight.

A hydrophobic solvent may be added to the hydrophilic solvent upon co-hydrolysis or after co-hydrolysis. Examples of the hydrophobic solvent include hexane, cyclohexane and isoparaffin hydrocarbons. The hydrophobic solvent may be used in any desired amount, preferably in an amount of 80% by weight or less to the total amount of the hydrophilic solvent and the hydrophobic solvent.

Co-hydrolysis is effected in water. Water is preferably added in such amounts to provide about 0.5 to 2 equivalents of water relative to the alkoxy group available in the compounds of formulae (I) and (II). On this basis, less than 0.5 equivalent of water would result in a lower degree of hydrolysis and hence, lower reactivity with an inorganic surface. More than 2 equivalents of water is often superfluous.

In the practice of the invention, minor amounts of acid may be added to the hydrolysis system for the purpose of promoting hydrolysis reaction. Exemplary acids are hydrochloric acid, sulfuric acid, nitric acid, acetic acid, methanesulfonic acid, trifluoromethanesulfonic acid, paratoluenesulfonic acid, trifluoroacetic acid, and phosphoric acid.

Co-hydrolysis is preferably effected at a temperature of about 50° to 100° C. for about 2 to 10 hours though the invention is not limited thereto.

According to the present invention, an organopolysiloxane of the general formula (III) is blended as a second component (2).

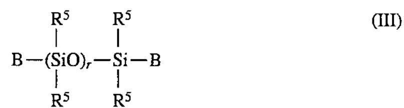

(III)

$R^5$ is a monovalent hydrocarbon group having 1 to 20 carbon atoms, the $R^5$ groups may be identical or different, B is a hydroxyl group, monovalent hydrocarbon group having 1 to 4 carbon atoms, alkoxy group or acyloxy group, and letter r is an integer of 1 to 100.

Examples of the hydrocarbon group represented by $R^5$ include methyl, ethyl, n-propyl, isopropyl, n-butyl, n-hexyl, cyclohexyl, and phenyl groups. Examples of the group represented by B include hydroxyl, methyl, ethyl, n-propyl, isopropyl, n-butyl, methoxy, ethoxy, n-propoxy, isopropoxy, and acetoxy groups. Letter r is an integer of 1 to 100, preferably 3 to 100. With r of less than 3, the contribution of the organopolysiloxane to water droplet falling would sometimes be short so that blending of the organopolysiloxane might become meaningless. Organopolysiloxanes with r in excess of 100 are less soluble in the co-hydrolyzate solution so that the entire composition becomes less stable.

Examples of the organopolysiloxane of formula (III) are given below.

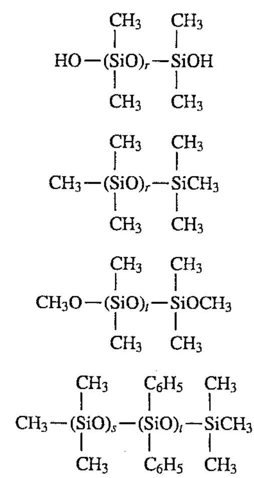

In the formulae, r is as defined above, and s+t=r.

The organopolysiloxane of formula (III) is preferably blended such that the amount of an active component in a co-hydrolysis product of the perfluoroalkyl group-containing organic silicon compound of formula (I) and the hydrolyzable group-containing methylpolysiloxane compound of formula (II), that is, the co-hydrolysis product minus the hydrophilic solvent, and the amount of organopolysiloxane of formula (III) are in a weight ratio of from 10/90 to 99/1, especially from 40/60 to 90/10. If the amount of an active component in a co-hydrolysis product is less than 10% by weight, durability is sometimes low. If the same is more than 99% by weight, water droplet falling and hence, stain-proofness would be insufficient.

The composition of the invention contains a strong acid as a third component (3). Exemplary acids are hydrochloric acid, sulfuric acid, nitric acid, methanesulfonic acid, trifluoromethanesulfonic acid, para-toluenesulfonic acid, trifluoroacetic acid, and phosphoric acid though not limited thereto.

The strong acid is preferably blended in an amount of 0.01 to 100 parts, more preferably 0.1 to 50 parts by weight per 100 parts by weight of the active component in a co-hydrolysis product and the organopolysiloxane combined. On this basis, less than 0.01 part of the acid would fail to provide durability whereas more than 100 parts of the acid would render the composition less stable.

The water repellent composition of the invention is prepared by blending components (1), (2) and (3) as defined above and may be used as such. If desired, the blend may be diluted with any of the above-mentioned hydrophilic solvents and organic solvents, for example, aromatic hydrocarbons such as benzene, toluene, and xylene and esters such as ethyl acetate and isobutyl acetate, typically to a concentration of about 0.1 to 5% by weight before use. The water repellent composition is applied to a surface of an article to be treated by conventional methods such as dipping, spraying, brush coating, and spin coating, followed by drying to render the surface durably water repellent and stain-proof. Drying at room temperature is satisfactory although heating at 40° to 200° C. for 5 to 60 minutes is favorable for durability.

There has been described a water repellent composition comprising a co-hydrolyzate of a perfluoroalkyl group-containing organic silicon compound and a hydrolyzable group-containing methylpolysiloxane compound, an organopolysiloxane, and a strong acid. The composition has excellent water repellency, quick falling of water droplets, and durability and thus imparts long-lasting water repellency and stain-proofness to a surface of an article treated therewith. Since the composition is soluble in organic solvents, it can be used in surface treatment of various articles of inorganic materials presenting an inorganic surface. The composition is widely used in surface treatment of glazing in buildings, trains, aircraft and other vehicles, optical parts such as mirrors and glass lenses, various glass articles, porcelain, tiles, and plastic materials having inorganic anti-reflection coatings or silicone hard coatings because its coating is self-cleaning by rain.

EXAMPLE

Examples of the present invention are given below by way of illustration and not by way of limitation.

Example 1

A 1-liter glass reactor equipped with a thermometer, stirrer, and condenser was charged with 10.0 g of a perfluoroalkyl group-containing organic silicon compound as shown below, 10.0 g of a hydrolyzable group-containing methylpolysiloxane compound as shown below, 480.0 g of isopropanol as a hydrophilic solvent, and 1.94 g of 0.1N aqueous hydrochloric acid. Co-hydrolysis reaction was effected at 80° C. for 5 hours, obtaining an isopropanol solution of the co-hydrolyzate.

Perfluoroalkylated silicon compound:

$$C_8F_{17}CH_2CH_2Si(OCH_3)_3$$

Methylpolysiloxane compound:

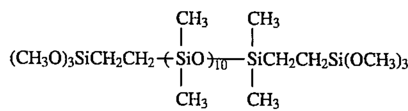

To the solution were added 10.0 g of an organopolysiloxane as shown below and 5.0 g of methanesulfonic acid. Stirring for 10 minutes yielded a water repellent composition in solution form.

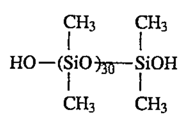

Examples 2–9 and Comparative Examples 1–3

Water repellent compositions in solution form were prepared by the same procedure as in Example 1 except that the type and amount of the perfluoroalkyl group-containing organic silicon compound, hydrolyzable group-containing methylpolysiloxane compound, aqueous hydrochloric acid, hydrophilic solvent, organopolysiloxane, and strong acid as well as hydrolysis conditions were changed as shown in Table 1.

The water repellent agent solutions of Examples and Comparative Examples, 0.1 ml, were coated onto glass plates of 70 mm×150 mm which had been degreased and cleaned with acetone and dried, by spreading 30 times with cotton fabric. After surplus coating solution was wiped off with dry fabric, the coated glass plates were heat treated at 100° C. for 10 minutes.

As a durability test, the treated glass plates were immersed in hot water at 100° C. for 6 hours.

Before and after the test, the coated surfaces were determined for contact angle with water and water droplet drop angle by the following tests to examine initial water repellency and heavy duty water repellency. The results are shown in Table 1.

Contact angle with water

5 μl of water was placed on a glass plate held horizontally. A contact angle with water was measured by means of a contact angle meter model CA-A (manufactured by Kyowa Kagaku K.K.).

Water droplet drop angle

A glass plate was set horizontally in a static frictional coefficient measuring machine model HEIDON-10 (manufactured by Shinto Kagaku K.K.). After 100 μl of water was placed on the glass plate, the plate was gradually inclined. The angle at which water started flowing down under gravity was measured.

TABLE 1

| | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| Co-hydrolyzate | | | | | | | | | | | | |
| Perfluoroalkylated silicon compound (g) | | | | | | | | | | | | |
| Compound of formula (1) | — | — | 15.0 | 15.0 | 15.0 | — | — | — | — | — | — | — |
| Compound of formula (2) | 10.0 | 10.0 | — | — | — | 10.0 | 10.0 | 10.0 | 10.0 | 10.0 | 10.0 | 10.0 |
| Methylpolysiloxane compound (g) | | | | | | | | | | | | |
| Compound of formula (3) | 10.0 | 10.0 | — | — | — | — | 10.0 | 10.0 | 10.0 | 10.0 | 10.0 | 10.0 |
| Compound of formula (4) | — | — | — | — | — | 10.0 | — | — | — | — | — | — |
| Compound of formula (5) | — | — | 15.0 | 5.0 | 5.0 | — | — | — | — | — | — | — |
| Water (g) | 1.94 | 1.94 | — | — | — | — | 1.94 | 1.94 | 1.94 | 1.94 | 1.94 | 1.94 |
| 0.1N HCl water | — | — | 3.29 | 2.46 | 2.46 | 1.17 | — | — | — | — | — | — |
| 0.1N $H_2SO_4$ water | | | | | | | | | | | | |

TABLE 1-continued

| | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| Hydrophilic solvent (g) | | | | | | | | | | | | |
| Isopropanol | 480.0 | 480.0 | — | — | — | 480.0 | 480.0 | — | — | — | — | — |
| t-butanol | — | — | — | — | — | — | — | — | 320.0 | — | — | — |
| Methyl ethyl ketone | — | — | 480.0 | 480.0 | — | — | — | 480.0 | — | 480.0 | 480.0 | 480.0 |
| hexane* | — | — | — | — | — | — | — | — | 160.0 | — | — | — |
| Co-hydrolysis conditions (°C./hour) | 80/5 | 80/5 | 80/2 | 80/2 | 80/2 | 80/10 | 80/10 | 80/5 | 25/24 | 80/5 | 80/5 | 80/5 |
| Organopolysiloxane (g) | | | | | | | | | | | | |
| Compound of formula (6) | 10.0 | — | — | — | — | — | — | — | 10.0 | — | 10.0 | — |
| Compound of formula (7) | — | 10.0 | 5.0 | 10.0 | 15.0 | — | — | 5.0 | — | — | — | — |
| Compound of formula (8) | — | — | — | — | — | 10.0 | — | — | — | — | — | — |
| Compound of formula (9) | — | — | — | — | — | — | 10.0 | — | — | — | — | — |
| Strong acid (g) | | | | | | | | | | | | |
| conc. sulfuric acid | — | 0.5 | — | — | — | 0.5 | 0.5 | 0.5 | — | — | — | — |
| Methanesulfonic acid | 5.0 | — | 5.0 | 5.0 | 5.0 | — | — | — | 5.0 | — | — | 5.0 |
| Properties | | | | | | | | | | | | |
| Initial water repellency | | | | | | | | | | | | |
| Contact angle with water (deg.) | 110 | 109 | 102 | 111 | 107 | 112 | 102 | 108 | 110 | 110 | 102 | 106 |
| Water droplet drop angle (deg.) | 12 | 11 | 10 | 14 | 11 | 13 | 14 | 14 | 13 | 18 | 14 | 24 |
| Heavy duty water repellency (100° C./6 hr.) | | | | | | | | | | | | |
| Contact angle with water (deg.) | 101 | 101 | 100 | 102 | 100 | 105 | 99 | 103 | 102 | 84 | 78 | 101 |
| Water droplet drop angle (deg.) | 15 | 16 | 13 | 18 | 16 | 17 | 18 | 17 | 15 | 32 | 36 | 30 |

*hydrophobic solvent (1) $C_4F_9CH_2CH\overset{CH_3}{\overset{|}{Si}}(OCH_3)_2$ (2) $C_8F_{17}CH_2CH_2Si(OCH_3)_3$ (3) $(CH_3O)_3SiCH_2CH_2-(\underset{CH_3}{\overset{CH_3}{Si}}O)_{10}-\underset{CH_3}{\overset{CH_3}{Si}}CH_2CH_2Si(OCH_3)_3$ (4) $CH_3-(\underset{CH_3}{\overset{CH_3}{Si}}O)_{30}-\underset{CH_3}{\overset{CH_3}{Si}}OSi(OCH_3)_3$ (5) $CH_3-(\underset{CH_3}{\overset{CH_3}{Si}}O)_{50}-(\underset{OSi(OCH_3)_3}{\overset{CH_3}{Si}}O)_{10}-\underset{CH_3}{\overset{CH_3}{Si}}CH_3$ (6) $HO-(\underset{CH_3}{\overset{CH_3}{Si}}O)_{30}-\underset{CH_3}{\overset{CH_3}{Si}}OH$ (7) $CH_3-(\underset{CH_3}{\overset{CH_3}{Si}}O)_{10}-\underset{CH_3}{\overset{CH_3}{Si}}CH_3$ (8) $CH_3O-(\underset{CH_3}{\overset{CH_3}{Si}}O)_{20}-\underset{CH_3}{\overset{CH_3}{Si}}OCH_3$ (9) $CH_3-(\underset{CH_3}{\overset{CH_3}{Si}}O)_{10}-(\underset{C_6H_5}{\overset{C_6H_5}{Si}}O)_5-\underset{CH_3}{\overset{CH_3}{Si}}CH_3$ As is evident from Table 1, the water repellent compositions of Examples within the scope of the invention are excellent in imparting water repellency and facilitating the falling of water droplets and durable, thus imparting long-lasting excellent water repellency and stain-proofness to a surface of an article treated therewith.

Comparative Example 4

| A water repellent composition in solution form was prepared by blending the following components. | |
|---|---|
| Compound of formula (2) | 10 g |
| Dimethylpolysiloxane terminated with OH at either end (viscosity 60 cs at 25° C.) | 10 g |
| Methanesulfonic acid | 5 g |
| Isopropyl alcohol | 480 g |

Comparative Example 5

| Component | Amount |
|---|---|
| Compound of formula (2) | 30 g |
| Methyltrimethoxysilane | 23 g |
| Dimethylpolysiloxane terminated with OH at either end (viscosity 60 cs at 25° C.) | 12 g |

These components were mixed. With stirring, 0.5 g of 0.1N aqueous hydrochloric acid was added dropwise to the mixture to effect co-hydrolysis. The mixture was aged at 70° C. for one hour, cooled, and poured into 1,500 g of isopropyl alcohol, obtaining a water repellent composition in solution form.

Comparative Example 6

With stirring, 0.5 g of 0.1 N aqueous hydrochloric acid was added dropwise to 23 g of compound of formula (2) to effect hydrolysis. The mixture was aged at 70° C. for one hour. To the hydrolyzate solution were added 12 g of dimethylpolysiloxane terminated with OH at either end (viscosity 60 cs at 25° C.) and 15 g of methanesulfonic acid. The mixture was poured into 1,500 g of isopropyl alcohol, obtaining a water repellent composition in solution form.

The water repellent agent solutions of Comparative Examples 4 to 6 were similarly examined for initial water repellency and heavy duty water repellency. The results are shown in Table 2.

TABLE 2

| | Comparative Example | | |
|---|---|---|---|
| | 4 | 5 | 6 |
| Initial water repellency | | | |
| Contact angle with water (deg.) | 102 | 100 | 107 |
| Water droplet drop angle (deg.) | 18 | 25 | 14 |
| Heavy duty water repellency (100° C./6 hr.) | | | |
| Contact angle with water (deg.) | 65 | 75 | 98 |
| Water droplet drop angle (deg.) | 33 | 31 | 30 |

Japanese Patent Application No. 212121/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A water repellent composition comprising in admixture, (1) a hydrolyzate resulting from co-hydrolysis of a perfluoroalkyl group-containing organic silicon compound and a hydrolyzable group-containing methylpolysiloxane compound in a hydrophilic solvent, said perfluoroalkyl group-containing organic silicon compound having the following general formula (I):

$$C_pF_{2p+1}Q\overset{\displaystyle R_a^1}{\overset{|}{S}}iR^2_{3-a} \quad \text{(I)}$$

wherein $R^1$ is a monovalent hydrocarbon group having 1 to 4 carbon atoms, $R^2$ is an alkoxy or acyloxy group having 1 to 4 carbon atoms, Q is a divalent organic group having 2 to 10 carbon atoms, letter a is equal to 0 or 1, and p is an integer of 1 to 12, and said hydrolyzable group-containing methylpolysiloxane compound having the following general formula (II):

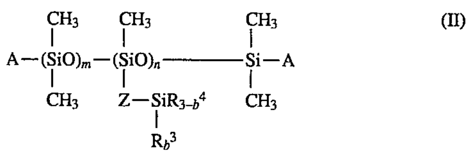

wherein $R^3$ is a monovalent hydrocarbon group having 1 to 4 carbon atoms, $R^4$ is an alkoxy or acyloxy group having 1 to 4 carbon atoms, A is a methyl group or a group represented by $—Z—Si(R^3_b)R^4_{3-b}$, Z is an oxygen atom or a divalent organic group having 2 to 10 carbon atoms, letter b is equal to 0, 1 or 2, m is an integer of 3 to 100, n is an integer of 0 to 50, and $5 \leqq m+n \leqq 100$, with the proviso that either one of the terminal A groups is a group represented by $—Z—Si(R^3_b)R^4_{3-b}$ when n=0, and where there is more than one $—Z—Si(R^3_b)R^4_{3-b}$, they may be identical or different, (2) an organopolysiloxane of the following general formula (III):

$$B-(\underset{R^5}{\overset{R^5}{Si}}O)_r-\underset{R^5}{\overset{R^5}{Si}}-B \quad \text{(III)}$$

wherein $R^5$, which may be identical or different, is a monovalent hydrocarbon group having 1 to 20 carbon atoms, B, which may be identical or different, is a hydroxyl group, monovalent hydrocarbon group having 1 to 4 carbon atoms, alkoxy group or acyloxy group, and letter r is an integer of 1 to 100, and (3) a strong acid.

2. The water repellent composition of claim 1 wherein the perfluoroalkyl group-containing organic silicon compound of formula (I) and the hydrolyzable group-containing methylpolysiloxane compound of formula (II) are blended such that the weight ratio of (I)/(II) ranges from 10/90 to 90/10.

3. The water repellent composition of claim 1 wherein the organopolysiloxane of formula (III) is blended such that the amount of an active component in a co-hydrolysis product of the perfluoroalkyl group-containing organic silicon compound of formula (I) and the hydrolyzable group-containing methylpolysiloxane compound of formula (II) and the amount of organopolysiloxane of formula (III) are in a weight ratio of from 10/90 to 99/1.

4. The water repellent composition of claim 1 wherein the strong acid is blended in an amount of 0.01 to 100 parts by weight per 100 parts by weight of the active component in a co-hydrolysis product and the organopolysiloxane combined.

* * * * *

UNITED STATES PATENT AND TRADEMARK OFFICE

CERTIFICATE OF CORRECTION

PATENT NO. : 5,599,893

DATED : February 04, 1997

INVENTOR(S) : Mitsuo ASAI et al.

It is certified that error appears in the above-indentified patent and that said Letters Patent is hereby corrected as shown below:

Title Page:

Item #73 Assignee:

After "Japan" insert - - and Nippon Sheet Glass Co., Ltd., Osaka, Japan - -.

Signed and Sealed this

Thirteenth Day of January, 1998

Attest:

BRUCE LEHMAN

*Attesting Officer*

*Commissioner of Patents and Trademarks*